May 30, 1950 A. M. ROSSMAN 2,509,842
TORQUE CONVERTER
Filed Sept. 27, 1944
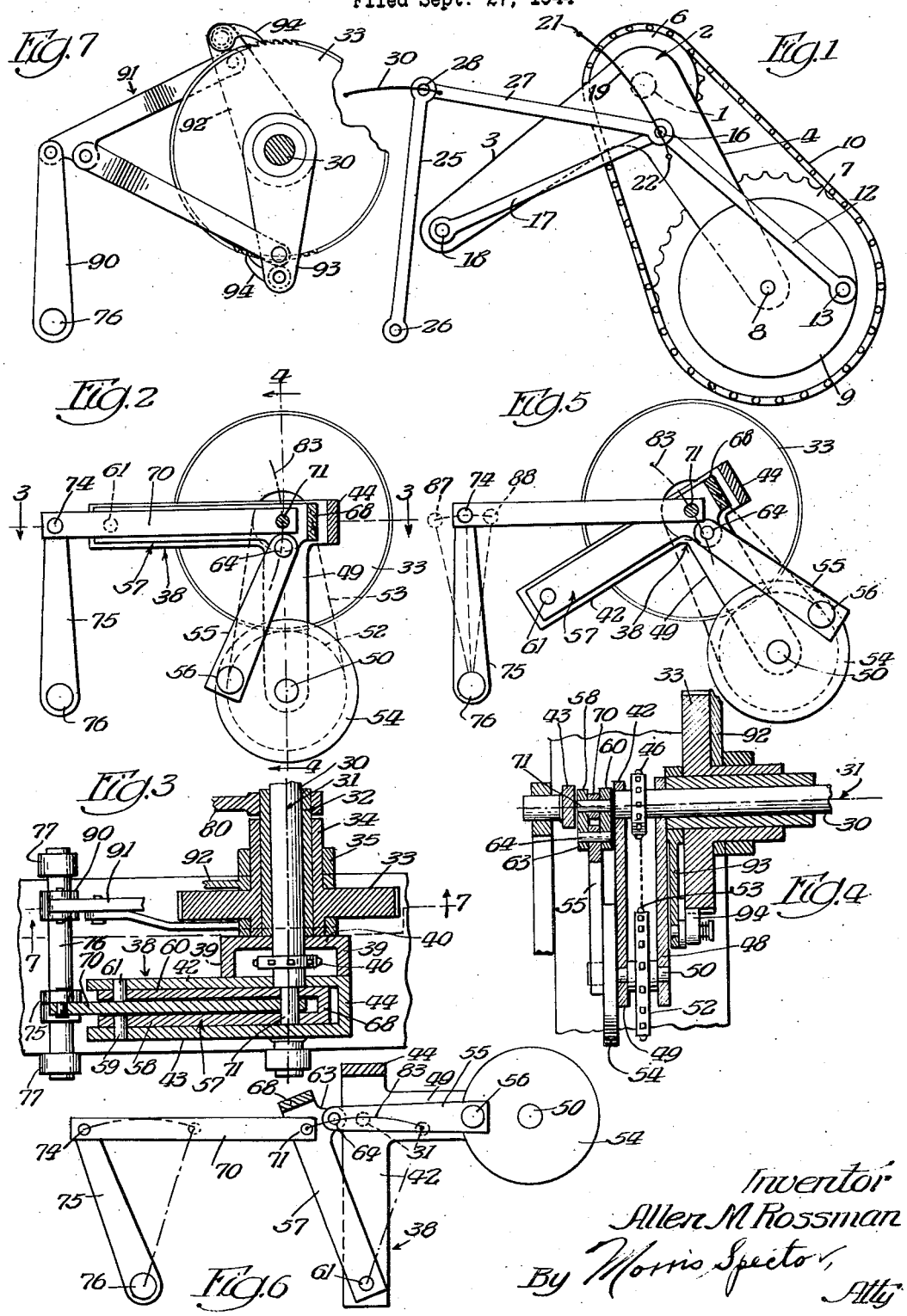
Inventor
Allen M. Rossman
By Morris Spector, Atty Patented May 30, 1950

2,509,842

UNITED STATES PATENT OFFICE 2,509,842

TORQUE CONVERTER

Allen M. Rossman, Wilmette, Ill.

Application September 27, 1944, Serial No. 556,000

16 Claims. (Cl. 74—42)

This invention relates to transmission devices of the continuously variable type, and more particularly to such devices as convert rotary motion into variable stroke reciprocating motion. The variable stroke reciprocatory motion may be used in any desired manner as, for instance, for operating a reciprocating mechanism such as a reciprocating pump piston, which would then have a variable stroke; or may be converted to variable rotary motion wherein the amount of rotary motion produced varies as a function of the amplitude of reciprocation. When so used the device of the present invention becomes a speed change mechanism or torque converter of the continuously variable type.

It is one of the objects of the present invention to provide a continuously variable type of mechanism of the class above set forth wherein the change of speed may be made while the mechanism is in operation and wherein the permissible range in speed change is from zero to a maximum in a stepless manner. It is a still further object of the present invention to provide a mechanism of the above mentioned character which will be simple and economical of construction and efficient in operation and which may be contained in a substantially enclosed structure that can be readily attached between a driving and a driven member.

It is a still further object of the present invention to provide a speed changing mechanism of the above mentioned character wherein the transmission is made by a series of links and levers wherein a fixed angular stroke of one oscillating member is converted into a variable angular stroke of another oscillating member.

The attainment of the above and further objects of the present invention will be apparent from the following specification taken in conjunction with the accompanying drawing forming a part thereof.

In the drawing:

Figure 1 is a diagrammatic view of a linkage which is a part of the present invention;

Figure 2 is a side view of a speed change device of the present invention;

Figure 3 is a sectional view taken along the line 3—3 of Figure 2 and looking in the direction of the arrows;

Figure 4 is a sectional view taken along the line 4—4 of Figure 2 and looking in the direction of the arrows;

Figures 5 and 6 are views corresponding to Figure 2 and showing the apparatus in other positions; and Figure 7 is a fragmentary sectional view taken along the line 7—7 of Figure 3.

Reference may now be had to Figure 1. In this figure there is shown a drive shaft 1 rotatable about a fixed axis. On this drive shaft is mounted a frame 2 of a generally L-shape, having two arms 3 and 4. A gear 6 keyed to the shaft 1 drives a gear 7 mounted on a stud shaft 8 carried by the arm 4. The gear 7 is mounted on one side of the arm 4 and, on the opposite side of the arm 4 on the same stud is keyed a disc 9. A sprocket chain 10 connects the gears 6 and 7. A connecting rod 12 is pivoted at one end 13 to the disc 9. The opposite end of the connecting rod is connected by a pivot 16 to a guiding link which is pivoted to the arm 3 at 18. It is thus apparent that as the disc 9 rotates the connecting rod 12 actuates the guiding link 17 in an arcuate path 19 centered about the center 18. The point 16 oscillates along the arc 19 between the limiting positions 21 and 22, the length of stroke being determined by the distance of the center 13 from the center 8. A crank arm 25 of a length approximately equal to the length of the link 17 is pivoted about a fixed pivot 26 and is actuated by a second link 27 which is pivotally connected at one end to the crank arm by a pivot 28 and pivotally connected at its other end to the pivot 16, so that one end of the link 27 moves along the arcuate path 19 and the other end is guided by the crank 25 and rocks the end of the crank about an arcuate path 30 centered at 26. Although the amplitude of oscillation of the point 16 remains constant, the amplitude of oscillation of the crank 25 may vary from zero to a maximum depending upon the angular position of the frame 2, which determines the position of the arc 19.

If the entire frame 2 is turned about the drive shaft 1 as a center it is apparent that the locus 19 of the point 16 will also be turned about the shaft 1 as an axis, said locus 19 being always the arc of a circle centered at the center 18 on the arm 3.

Assume that the frame 2 is rotated in a clockwise direction until the center 18 intersects the arc 30. The locus arc 19 will still be an arc of a circle centered about the new center 18, which is then on the arc 30. The link 17 is preferably of a length approximately the same length as is the link 27. Therefore, the center 18 and the center 28 will approximately coincide. If they coincide, when the link 17 is oscillated the right hand end of the link 27, which follows the arc 19, will be moving about the pivot point 28 as a center and the crank arm 25 will be stationary. On the other hand, if the frame 2 is rotated in a counter-clockwise direction until the point 18 is at a distance from the point 26 equal to the length of the link 27 the points 16, 18, 26 and 28 will constitute corners of a parallelogram of which the point 26 is a permanent fixed point, and if the point 18 is then held fixed a movement of the link 17 along the locus 19 (which locus is in a fixed relation with respect to the frame 2) will produce a corresponding movement of the point 28. It is thus apparent that by adjusting the position of the frame 2 about the shaft 1 and holding it in its adjusted position the amplitude of the oscillation of the crank 25 can be varied between zero and maximum limits to any value determined by the angular position in which the frame 2 is held.

Reference may now be had more particularly to Figures 2, 3 and 4 showing a specific embodiment of the present invention. In this embodiment there is shown at 30 a drive shaft which is rotatable about a fixed axis 31 and which may be driven in any desired manner, not shown, as by an internal combustion engine, a constant speed electric motor, or any other means. Concentrically mounted on this shaft and independently rotatable, is an adjusting sleeve 32. Rotatably mounted on the sleeve 32 concentric therewith and independently rotatable is a driven gear or ratchet 33. The gear or ratchet 33 has a sleeve 34 thereon which is suitably journalled in a supporting bearing 35.

A frame 38 is welded or otherwise secured to the adjusting sleeve 32 so that by turning of the sleeve the angular position of the frame may be adjusted, in a manner as will be more fully set forth as this description proceeds. The frame includes a channel member having flanges 39—39 (Fig. 3) and a web portion 40 which is welded to the end of the sleeve 32. The frame 38 also includes a U-shaped member the arms 42—43 of which are joined by a bight portion 44. The ends of the flanges 39—39 are welded to the arm 42. The drive shaft 30 extends through the web 40 and into a round hole in the arm 42 and terminates at the inner surface of the arm 42. Within the channel 39—40 the shaft 30 has a sprocket gear 46 keyed thereto. The web 40 has a downwardly projecting extension 48, and the arm 42 has a similar downwardly projecting extension 49. Between the bottom ends of these two projections there is rotatably mounted a stud shaft 50 on which is keyed a sprocket gear 52 that is driven by the gear 46 through a sprocket chain 53. The stud shaft 50 passes through the downwardly extending projection 49 and has keyed thereto a disc 54 which is thus rotatable with the stud shaft.

The disc 54 operates a connecting rod 55 one end of which is pivoted to the disc by a pivot 56. The opposite end of the connecting rod 55 is guided in an arcuate path by a U-shaped link 57. The U-shaped link 57 lies between the arms 42—43 and includes one arm 58 pivoted to the arm 43 by a short pin 59 and includes another arm 60 pivoted to the arm 42 by a short pin 61, the pins 60—61 being in axial alignment. Each of the arms 58—60 of the guiding link 57 has a lobe or ear 63 between which lobes or ears the end of the connecting rod 55 is pivoted as by a pivot pin 64. The two ends of the arms 58—60 of the U-shaped guiding link 57 are joined together by a bight portion 68 to constitute the link 57 an integral structure. The link 57 is actuated by the connecting rod 55 and thus oscillates through a fixed arc about the centers of the pins 59—61 as an axis. The amplitude of this arc is determined entirely by the distance between the centers 50—56 on the disc 54. A second link 70 extends between the arms 58—60 of the link 57 and is pivoted to the arms 58—60 by a pin 71. The opposite end of the link 70 is pivotally connected by a pin 74 to a crank 75 which is keyed to a rocker shaft 76. The crank 75 oscillates the shaft 76. The shaft may be supported in any desired manner as, for instance, by bearings 77—77.

The frame 38 may be adjusted to any desired angular position, as by means of a handle 80 (Fig. 3), and held in that position. The angular position of the frame will determine the amplitude of oscillation of the shaft 76, as will be presently explained.

An explanation will now be given of the mode of operation of the structure thus far described. Assume that the shaft 30 is rotating at a constant speed. Through the step-down gearing comprising the sprocket wheel 46, sprocket chain 53 and sprocket wheel 52 the drive shaft 30 rotates the disc 54 at a reduced constant speed. Assume now that the frame 38 has been adjusted to the position illustrated in Figure 6 and is held in that position. The rotating disc 54 acting through the connecting rod 55 oscillates the link 57 about the pin 61 so that the pin 71 moves over a fixed arc 83 the amplitude of which is determined by the distance between the centers 56—50. The crank arm 75 is of an effective length exactly equal to the length between the pivot axes 61—71. In the position illustrated in Figure 6 the distance between the pivot 61 and the center of the shaft 76 is exactly equal to the distance between the pivots 71—74. It is thus apparent that in the position illustrated in Figure 6 the pivot centers 61—71—74—76 constitute corners of a parallelogram of which the pivot 76 is a permanently fixed pivot and the pivot 61 is held temporarily in the position illustrated in Figure 6. It is therefore apparent that oscillation of the link 57 will be transmitted to the crank 75 by the link 70 and that the crank 75 will therefore oscillate through an arc exactly equal to the arc of oscillation of the link 57. Figure 6 represents the position of maximum amplitude of oscillation of the crank 75.

An explanation will now be given of the mode of action of the transmission when the transmission is in its neutral position where no oscillation of the crank is desired. This is the position of the transmission illustrated in Figure 2. Assume that the frame 38 is rotated about the axis 31, in a clockwise direction from the position illustrated in Figure 6 to that illustrated in Figure 2. In that position the rotation of the disc 54 still produces oscillation of the guiding link 57 through the same arcuate path 83. However, the locus 83 while fixed with respect to the frame 38 has now turned through an angle of 90°. The arc is still centered about the pivot 61 as a center. Due to the proximity of the center 61 with the center 74 it is apparent that as the right hand end of the link 70 follows the arc 83 the left hand end will pivot about the center 74 and produce a negligible oscillation of the center 74 and therefore negligible oscillation of the crank 75 and of the shaft 76. This may be considered as the zero position of the transmission.

In any intermediate position of the transmission the amplitude of oscillation of the crank 75 will vary (between zero and the maximum limits) in accordance with the angle of the frame 38. An intermediate position is illustrated, by way of example, in Figure 5. In this figure the frame 38 is shown in a position between the positions illustrated in Figures 2 and 6. Here the arc 83, which represents the amplitude of oscillation of the link 57, is again of the same length as in Figure 6 but it is apparent that as the point 71 moves along the arc 83 between its two extreme positions it will cause the point 74, which is the end of the crank arm 75, to oscillate between limits indicated at 87—88, which represents a smaller amplitude of oscillation than the amplitude of oscillation of the crank 75 when the frame 38 is in the position illustrated in Figure 6.

The oscillatory motion of the shaft 76 which is of a controlled variable amplitude that may be varied from zero to a maximum may be utilized in any desired manner. To that effect the rock shaft 76 has an arm 90 keyed thereto which is oscillated by the shaft. The motion of the arm 90 may be transmitted or the motion of the arm 75 may be transmitted to a pump piston to produce a variable stroke of a pump plunger to vary the capacity of the pump. Also, the variable stroke oscillatory motion of the arm 90 may be converted into a variable speed rotary motion. This is illustrated in Figure 7 wherein the arm 90 transmits its oscillatory motion to rotate the driven gear or ratchet 33 by means of a double acting pawl device 91. The pawl device may be of a well known construction and includes a pair of arms that actuate the cranks 92—93 journalled on the hub of the ratchet 33 and carrying oppositely disposed pawl 94—94 to turn the ratchet 33, in a manner well known in the art.

Instead of turning the frame 38 to produce variations in the amplitude of oscillation of the shaft 76 the equivalent result can be obtained by keeping the frame 38 stationary and moving the center of the shaft 76 about the axis 31 as a center.

From the above description it is apparent that I have provided a variable speed transmission of the continuously variable type wherein the speed ratio may be changed in an infinite number of steps, the particular transmission from the oscillatory shaft 76 to the gear 33 being here shown merely for illustrative purposes, since gearing for converting variable oscillatory motion to variable rotary motion are well known in the art. Likewise, the power for oscillating the link 57 over the arc 83 of fixed amplitude may be transmitted thereto in a different manner. For instance, the member 54 may be driven by an electric motor mounted directly on the frame 36, in which case the sprocket 46 would be omitted. Alternately, if desired, the sprocket 46 may be replaced by a crank arm, and the frame 38 provided with a series of links which form a parallelogram with the link 57, the parallelogram being then actuated by a connecting rod joining it with the crank arm.

In compliance with the requirements of the patent statutes I have here shown and described a preferred embodiment of my invention. It is, however, to be understood that the invention is not limited to the precise construction here shown, the same being merely illustrative of the principles of the invention. What is considered new and desired to be secured by Letters Patent is:

1. A speed change device of the continuously variable transmission type which comprises, a frame mounted for angular adjustment about a fixed axis, a rotatable driving member carried by the frame and movable therewith in the adjustment of the frame, the driving member being mounted with its axis of rotation spaced from said fixed axis, a link pivoted on said frame, means connecting said link with said member for oscillating said link through a fixed angle of oscillation, a crank arm mounted for oscillatory movement about an axis outside of said frame, a second link pivoted to the crank arm and pivoted to the first link whereby one end of the second link has an oscillatory motion determined by the first link, in one position of the frame, the pivot axis of the first link being adjacent the pivotal connection between the crank arm and the second link whereby the amplitude of oscillation of the crank arm is a minimum, and means for turning the frame about said fixed axis from said one position in a direction moving the pivot of the first link with said frame away from the connection between the second link and the crank arm through an angle at least approximating 90° to increase the amplitude of oscillation of the crank arm.

2. A speed change device of the continuously variable transmission type which comprises a rotatable shaft, a frame mounted for angular adjustment about an axis coincident with the axis of the shaft, a rotatable member carried by the frame and rotatable about an axis spaced from the longitudinal axis of the shaft, a driving connection interconnecting said member and the shaft, a link pivoted on said frame, means connecting said link with said member for oscillating said link through a fixed angle of oscillation, a crank arm mounted for oscillatory movement about an axis outside of said frame, a second link pivoted to the crank arm and pivoted to the first link whereby one end of the second link has an oscillatory motion determined by the first link, in one position of the frame the pivot axis of the first link being adjacent the pivotal connection between the crank arm and the second link whereby the amplitude of oscillation of the crank arm is a minimum, and means for turning the frame from said one position through an angle at least approximating 90° to increase the amplitude of oscillation of the crank arm.

3. A speed change device of the continuously variable transmission type which comprises concentric driving and driven shafts, a frame mounted for angular adjustment about an axis coincident with the axes of the shafts, a rotatable member carried by the frame and with its axis of rotation parallel to and spaced from the longitudinal axis of the shafts, means including a speed reducing gearing coupling said member with the driving shaft, a link pivoted on said frame, means connecting said link with said member for oscillating said link through a fixed angle of oscillation, a crank arm mounted for oscillatory movement an axis outside of said frame, a second link pivoted to the crank arm and pivoted to the first link whereby one end of the second link has and oscillatory motion determined by the first link, in one position of the frame the pivot axis of the first link being adjacent the pivotal connection between the crank arm and the second link whereby the amplitude of oscillation of the crank arm is a minimum, means for turning the frame from said one position through an angle at least aproximating 90° to increase the amplitude of oscillation of the crank arm, and means forming a driving connection between said crank arm and the driven shaft.

4. A speed change device of the continuously variable transmission type which comprises, a driving shaft, a frame mounted for angular adjustment about an axis coincident with the axis of the shaft, a rotatable member carried by the frame, means including a speed reducing gearing coupling said member with the driving shaft, a link pivoted on said frame, means connecting said link with said member for oscillating said link through a fixed angle of oscillation, a crank arm mounted for oscillatory movement about an axis outside of said frame, a second link pivoted to the crank arm and pivoted to the first link whereby one end of the second link has an oscillatory motion determined by the first link, in one position of the frame the pivot axis of the first link being adjacent the pivotal connection between the crank arm and the second link whereby the amplitude of oscillation of the crank arm is a minimum, means for turning the frame from said one position through an angle at least approximating 90° to increase the amplitude of oscillation of the crank arm, a driven shaft, and means forming a driving connection between said crank arm and the driven shaft.

5. A speed change device of the continuously variable transmission type which comprises, a frame mounted for angular movement about a fixed axis, a driving member carried by the frame and movable therewith in the adjustment of the frame, a link pivoted on said frame, a connecting rod connecting said link with said member for oscillating said link through a fixed angle of oscillation, a crank arm mounted for oscillatory movement about an axis outside of said frame, a second link pivoted to the crank arm and pivotally connected to the first link whereby one end of the second link has an oscillatory motion determined by the first link, and means for turning the frame through an angle at least approximating 90° to change the amplitude of oscillation of the crank arm.

6. A speed change device of the continuously variable transmission type which comprises, a frame mounted for angular movement about a fixed axis, a driving member carried by the frame and movable therewith in the adjustment of the frame, a link pivoted on said frame, a connecting rod connecting said link with said member for oscillating said link through a fixed angle of oscillation, a crank arm mounted for oscillatory movement about an axis outside of said frame, a second link pivoted to the crank arm and pivotally connected to the first link whereby one end of the second link has an oscillatory motion determined by the first link, and means for turning the frame through an angle at least approximating 90° to change the amplitude of oscillation of the crank arm, the axis of movement of the frame being parallel to the pivotal axis of the first mentioned link and located substantially midway of the arc of oscillation of the connection between the two links.

7. In a speed change device of the continuously variable transmission type, a frame, a link pivoted on the frame about an axis fixed with respect to the frame, means including a rotatable member carried by the frame and a connection between said member and said link for oscillating the link over an arc fixed with respect to the frame, means forming a pivotal support for the frame for turning the frame about an axis parallel to the pivot axis of the link and located substantially midway of the extremes of oscillation of the end of the link, a crank arm pivoted about an axis outside of the frame, and means including a connecting rod joining the crank with the crank arm.

8. In a speed change device of the continuously variable transmission type, a frame, a link pivotally mounted on the frame, a rotary driving member mounted on the frame, means including a connecting rod connecting the rotary member with the link for oscillating the link, a crank arm pivoted for swinging movement about an axis outside of the frame, a second link pivoted to the crank arm, means pivotally connecting the two links, in one position of the device the center of the first link being adjacent the pivoted connection of the second link with the crank, and means for producing a relative change in position as between the frame and the crank arm axis by turning one with respect to the other.

9. In a speed change device of the continuously variable transmission type, a frame, a link pivotally mounted on the frame, a rotary driving member mounted on the frame, a connecting rod connecting the rotary member with the link for oscillating the link, a crank arm pivoted for swinging movement about an axis outside of the frame, a second link pivoted to the crank arm, means pivotally connecting the two links, in one position of the device the center of the first link being adjacent the pivoted connection of the second link with the crank, and means for producing a relative change in position as between the frame and the crank arm axis by turning one with respect to the other about an axis passing through the frame and substantially midway of the arc of oscillation of the first link, the device having a range of turning from said one position at least up to a position where the second link makes approximately the same angle with the first link that it makes with the crank arm.

10. A speed change device comprising a crank arm movable about a first fixed axis, a first link pivoted to said crank arm, a frame movable about a second fixed axis, a second link pivoted to said frame, means pivotally connecting said two links, means mounted on the frame for oscillating said second link about its pivot axis on the frame through an arc of a fixed length, said means being movable with said frame about said second fixed axis, means for positioning the said frame about the second axis to any position within a range of approximately 90° whereby the movement of the pivot connecting means of the two links is translated into a movement of the pivot connection between the first link and the crank arm of an amplitude determined by the angular position of the frame.

11. Mechanism for converting motion as between rotary motion and variable stroke oscillating motion, said mechanism comprising a power transmitting member, means guiding one end thereof for oscillation, means guiding the other end thereof for movement over an arc of fixed amplitude, said last named means comprising a pivoted link and a rotatable crank and a connecting rod connecting the link with the crank, the centers of movement of the link and the crank being fixed with respect to one another whereby the amplitude of oscillation of said other end of the power transmitting member is constant, a common support for said two centers, and means for turning the common support with respect to the means for guiding said one end of the power transmitting member, whereby the relative angularity of the loci of the two ends of the power transmitting member is changed to change the relative strokes of the two ends of said member.

12. Mechanism for converting motion as between rotary motion and variable stroke oscillating motion, said mechanism comprising a power transmitting member, means guiding one end thereof for oscillation, means guiding the other end thereof for movement over an arc of fixed amplitude, said last named means comprising a pivoted link and a rotatable crank and a connecting rod connecting the link with the crank, the centers of movement of the link and the crank being fixed with respect to one another whereby the amplitude of oscillation of said other end of the power transmitting member is constant, a common support for said two centers, and means for turning the common support about an axis midway of the arc of travel of said other end of the power transmitting member, whereby the relative angularity of the loci of the two ends of the power transmitting member is changed to change the relative strokes of the two ends of said member.

13. A speed change device of the continuously variable transmission type which comprises, a frame mounted for angular adjustment about a fixed axis, a rotatable driving member carried by the frame and movable therewith in the adjustment of the frame, the driving member being mounted with its axis of rotation spaced from said fixed axis, a link pivoted on said frame, means connecting said link with said member for oscillating said link through a fixed angle of oscillation, and means for turning the frame about said fixed axis through an angle at least approximating 90°.

14. A speed change device of the continuously variable transmission type which comprises a rotatable shaft, a frame mounted for angular adjustment about an axis coincident with the axis of the shaft, a rotatable member carried by the frame and rotatable about an axis spaced from the longitudinal axis of the shaft, a driving connection interconnecting said member and the shaft, a link pivoted on said frame, means connecting said link with said member for oscillating said link through a fixed angle of oscillation, and means for turning the frame from said one position through an angle at least approximating 90°.

15. In a speed change device of the continuously variable transmission type, a frame, a link pivoted on the frame about an axis fixed with respect to the frame, means including a rotatable member carried by the frame, a connection between said member and said link for oscillating the link over an arc fixed with respect to the frame, and means forming a pivotal support for the frame for turning the frame about an axis parallel to the pivot axis of the link and located substantially midway of the extremes of oscillation of the end of the link.

16. Mechanism for converting motion as between rotary motion and variable stroke oscillating motion, said mechanism comprising a frame mounted for angular adjustment about a fixed axis, a rotatable driving member carried by the frame and movable therewith in the adjustment of the frame, the driving member being mounted with its axis of rotation spaced from said fixed axis, a link pivoted on said frame and means connecting said link with said member for oscillating said link through a fixed angle of oscillation.

ALLEN M. ROSSMAN.

REFERENCES CITED

The following references are of record in the file of this patent:

UNITED STATES PATENTS

| Number | Name | Date |
| --- | --- | --- |
| 252,176 | Breed | Jan. 10, 1882 |
| 274,094 | Miller | Mar. 13, 1883 |
| 1,682,500 | Getz | Aug. 28, 1928 |
| 1,968,030 | De Filipis | July 31, 1934 |
| 2,305,128 | Andresen et al. | Dec. 15, 1942 |

Certificate of Correction

May 30, 1950

Patent No. 2,509,842

ALLEN M. ROSSMAN

It is hereby certified that errors appear in the printed specification of the above numbered patent requiring correction as follows:

Column 6, line 63, after the word "movement" insert *about*; line 66, for "and" after "has" read *an*;

and that the said Letters Patent should be read with these corrections therein that the same may conform to the record of the case in the Patent Office.

Signed and sealed this 15th day of August, A. D. 1950.

[SEAL]

THOMAS F. MURPHY,
*Assistant Commissioner of Patents.*